INVENTOR.
ROBERT E. MIERENDORF
BY Omund R. Dahle
ATTORNEY

United States Patent Office

3,346,772
Patented Oct. 10, 1967

3,346,772
CONTROL APPARATUS
Robert E. Mierendorf, Minneapolis, Minn., assignor to Honeywell Inc., Minneapolis, Minn., a corporation of Delaware
Filed Aug. 5, 1965, Ser. No. 477,523
1 Claim. (Cl. 317—13)

ABSTRACT OF THE DISCLOSURE

An over-temperature turn-off protection type of circuit for electrical apparatus such as motors utilizing a negative temperature coefficient thermistor to control a transistor switching circuit which in turn controls the energization of the electrical apparatus. A second transistor means controls the input voltage to the transistor switch to protect against an open circuit of the negative temperature coefficient element and to also provide operation in case of over-temperature.

---

This application relates to an improved solid state over-temperature control system for turning off electrical apparatus upon the temperature reading a predetermined temperature. In the specific embodiments shown in this application the over-temperature control system is used to deactivate a motor upon a rise of the temperature in the motor windings. This general type of system provides a temperature responsive element, such as a thermistor which may be embedded in the motor windings and connected electrically into a circuit which will be actuated by the change in resistance of the thermistor.

It is desirable to use NTC thermistors for over-temperature sensing. The NTC units are much less expensive than PTC units and have a greater availability. Also significant is the greater long range stability of the NTC units, the closer tolerances, their smaller mass and their faster thermal response. As the thermistor is of the negative coefficient type (NTC), an open circuit failure of the sensor or its leads will not provide an inherent fail safe condition of the system. In other words, the over-temperature control system is designed to respond and shut down the motor upon a temperature rise of the motor windings in which the sensor is heated and its impedance drops to a low value, an open circuit sensor caused by a failure of the element or an open sensor lead wire, however, would simulate a safe condition. This invention is arranged to provide a fail safe system which will shut down the motor in the event of sensor failure by either open circuit or short circuit in addition to shutting down the motor due to over-temperature of the motor.

Figure 1:
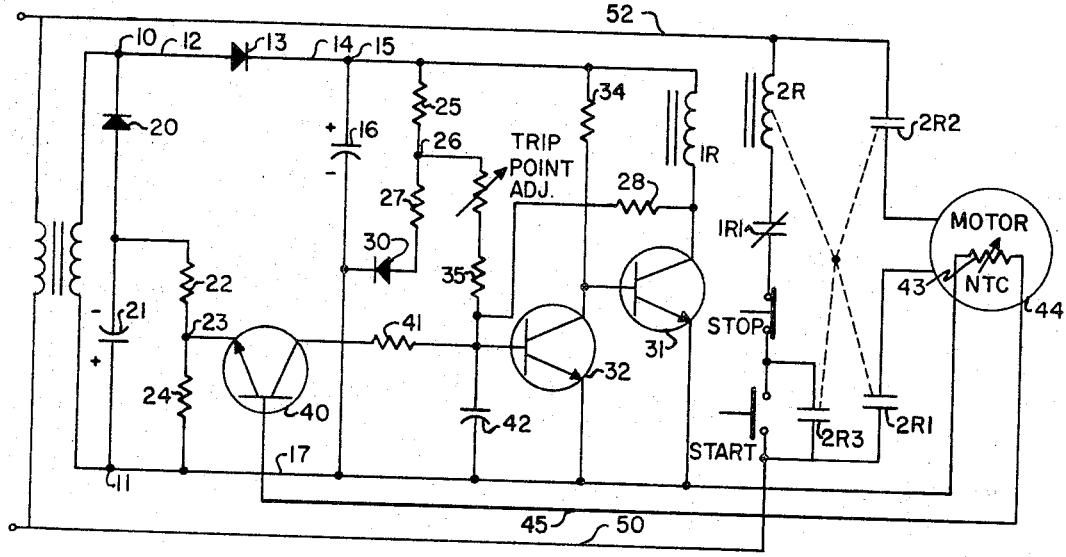

Referring now to the drawing and particularly to FIGURE 1, there is disclosed a pair of power input terminals 10 and 11 adapted to be connected to a suitable source of alternating line voltage current through a step down transformer. The terminal 10 is connected through a conductor 12, a first rectifier 13, a conductor 14, a junction 15, a filter capacitor 17 and a further conductor 17 to terminal 11 to provide a first DC potential. A second rectifier 20 and a second filter capacitor 21 are serially connected across the conductors 12 and 17 to provide a second DC potential of the opposite polarity from that on capacitor 16. Thus, with respect to common conductor 17, a positive and a negative DC potential are provided. Connected in parallel with the capacitor 21 is a voltage divider comprising a first resistance 22, a junction 23 and a second resistor 24. Similarly, connected in parallel with the capacitor 16 is a voltage divider comprising a third resistor 25, a junction 26, a fourth resistor 27 and a diode 30.

A pair of transistors 31 and 32 are connected in a conventional switching circuit. The collector current of transistor 31 controls an overload relay 1R and a circuit may be traced from the conductor 14 through the relay winding 1R, from collector to emitter of transistor 31 to conductor 17. A regenerative feedback path exists from the collector of transistor 31 through a resistor 28 to the base electrode of transistor 32. The collector electrode of transistor 32 is directly connected to the base of transistor 31. The base of transistor 31 is also connected through a bias resistor 34 to the conductor 14. A bias circuit of the transistor 32 may be traced from the junction 26 through a "trip point adjustment" potentiometer and a further resistor 35 of the base of transistor 32. The emitter of both transistors 31 and 32 are directly connected to the conductor 17.

A further switching transistor 40 is connected with its emitter directly connected to the junction 23 and its collector connected through a summing resistor 41 to the base electrode of transistor 32. A smoothing capacitor 42 is also connected between the base electrode of transistor 32 and the common conductor 17.

The control circuit for transistor 40 includes a negative temperature coefficient resistor 43 mounted in the windings of a motor 44, to be protected. The base circuit for transistor 40 may be followed through a conductor 45, the NTC thermistor 43 to the common conductor 17. The thermistor is embedded in the motor windings and the temperature of the motor windings sensed. The circuit for controlling the motor may be traced from the line terminal through a conductor 50, a normally open "start" switch, a normally closed "stop" switch, the closed contact 1R1 of energized relay 1R and through relay winding 2R and back through a conductor 52 to the other line terminal. The relay 2R has a pair of motor energizing contacts 2R1 and 2R2, and a holding contact 2R3 which is in parallel with the "start" switch.

Considering now the operation of the over-temperature circuit, let us consider the condition when the motor is operating normally.

Transistor 32 will conduct whenever the current into the base of the transistor through the trip point adjustment resistor and resistor 35 path and the resistor 28 path is greater than the current leaving the base through the resistor 41 and transistor 40. The current leaving the base of transistor 32 is controlled by the temperature of the NTC thermistor in the motor. Since the transistor 40 is normally always turned on, and if its base-to-emitter voltage is ignored, it may be seen that the thermistor is effectively connected in parallel with the resistor 24. This resistance 24 and 22 together with thermistor 43 comprises a voltage divider which determines how far negative junction 23 becomes with respect to terminal 11. This negative voltage controls the current through resistor 41. Whenever the NTC thermistor is cold, it will have a large resistance value thereby generating a large negative voltage at point 23. A correspondingly large current will flow through resistor 41 keeping transistor 32 turned off.

As the thermistor heats, its resistance decreases, the voltage at point 23 becomes less negative, the current through resistor 41 decreases and eventually transistor 32 turns on thereby turning off transistor 31. The point at which this switching occurs may be adjusted by the "trip-point adjustment" potentiometer. It is necesary that the circuit provides failsafe operation in case the sensor should short circuit. It can be seen that a short circuit on the sensor 43 would indicate a high temperature and therefore would turn off transistor 31 and de-energize the relay 1R turning off the motor.

The transistor 40 must also provide open circuit protection in case the sensor 43 or its lead wire should fail in the open position. Any current flow through the thermistor will turn the transistor 40 on sufficiently for circuit operation. If the thermistor should open, however, the transistor 40 will switch off and no current can flow through the resistor 41. Transistor 32 will then turn on and the switch 1R will be de-energized.

The arrangement of the over-temperature circuit including transistor 40 is an improved circuit which will provide for failsafe shutdown in the event of an open circuit or a short circuit of the sensor 43.

Figure 2:
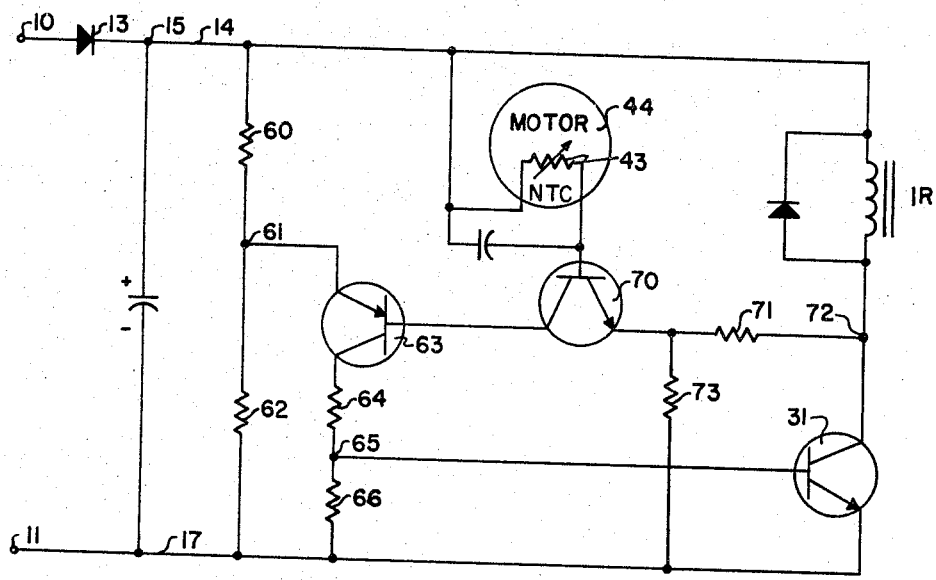

Referring now to FIGURE 2, it can be seen that in this modification the diode 20 and the capacitor 21 have been eliminated as there is no need for both a positive and a negative DC voltage in this embodiment. Where components are identical with those shown in FIGURE 1, the same reference numerals are used. The remarks below identify the circuit components which are changed from the previously described circuit.

A voltage divider is connected from conductor 14 to conductor 17 and this may be traced through a resistor 60, a junction 61 and a resistor 62 to the conductor 17. A PNP transistor 63 has its emitter electrode directly connected to the junction 61 and its collector electrode connected through another impedance path comprising a resistor 64, a junction 65 and a further resistor 66 to the negative conductor 17. The base electrode of transistor 63 is directly connected to the collector electrode of a further transistor 70. The emitter of NPN transistor 70 is connected through a resistor 71 to a junction 72 between relay 1R and the collector of transistor 31. The emitter of transistor 70 is further connected through a resistor 73 to the conductor 17. The base of transistor 70 is connected through the NTC temperature sensor 43 to the positive conductor 14.

Referring now to the operation of FIGURE 2 it will be assumed that no over-temperature condition exists so that the system is in its normal operating condition with all three transistors 31, 63 and 70 conducting. A current path which maintains transistor 70 conductive may be traced from the positive conductor 14 through the NTC thermistor, from base to emitter of transistor 70 and through the resistor 73 to the negative conductor 17. The transistor 70 receives sufficient base current through the thermistor so that it operates in a saturated condition. In this saturated condition the impedance from base to emitter of transistor 70 and the impedance from collector to the base is extremely small and appears substantially as a short circuit. In explaining the operation of the circuit, therefore, it is possible to consider transistor 70 as a junction point.

An output current path for the transistor 63 may be traced from the positive conductor 14 through resistor 60, from emitter to collector of transistor 63, through the resistors 64 and 66 to the negative conductor 17. The series connected resistors 60 and 62 form a voltage divider across the source with the emitter of transistor 63 being connected to the junction 61 between the resistors.

The base electrode of the transistor 31, being connected to the junction 65 between resistors 64 and 66, provides a bias to transistor 31 when transistor 63 is conducting to simultaneously turn on the transistor 31. The emitter-collector circuit of transistor 31 is directly in series with the relay winding 1R.

If the NTC sensing thermistor 43 should become an open circuit, a failsafe condition exists, since no base current then flows into transistor 70. Transistor 70 cuts off turning off transistor 63 and transistor 31. The relay 1R is de-energized and the motor is shut down. If the NTC thermistor should become a short circuit, the positive potential at conductor 14 is applied directly to the base of transistor 70 and as a result the emitter-base junction of transistor 63 is reverse biased so that it turns off. This again results in transistor 31 being turned off and relay 1R being turned on. Thus, in the event of an open circuit or a short circuit of the sensor, the system operates to a failsafe condition.

As the temperature in the motor increases, the NTC thermistor decreases in impedance thus bringing the potential of the base of transistor 70 closer to the positive potential at conductor 14. Since the transistor 70 is saturated during this time, the emitter potential and also the collector potential follows closely the base potential. At some point, the approach of the transistor 70 base electrode potential to the positive source potential causes the emitter-base of transistor 63 to begin to turn off. As transistor 63 begins ot turn off, the potential on resistor 66 is reduced so that transistor 31 begins to turn off. The voltage at the collector of transistor 31 increases and this positive going voltage at junction 72 is coupled back through resistor 71 to increase the turn off effects on transistor 63. When transistor 31 turns off, it may be seen that the resistor 71 is effectively in parallel with NTC thermistor 43, where previously it was effectively in parallel with resistor 73. This provides a differential and the temperature of the motor must now change a substantial amount before the NTC thermistor impedance increases sufficiently in value so that transistor 63 can again resume conduction.

In general, while I have shown certain specific embodiments of my invention, it is to be understood that this is for the purpose of illustration and that my invention is to be limited solely by the scope of the appended claim.

I claim as my invention:

In an over-temperature turn-off device for the protection of electrical apparatus: a source of unidirectional potential; voltage divider circuit means connected across said source of potential; a negative coefficient thermistor mounted in the apparatus to be protected; power switching means having a control circuit and a pair of power switching terminals adapted to be connected in circuit with the apparatus to control the energization thereof; said control circuit including transistor switching means and relay means connected to a first portion of said voltage divider circuit means to energize said relay means to close said power switching terminals when said negative coefficient thermistor detects a normal temperature in said protected electrical apparatus; second transistor means in series circuit with said negative coefficient thermistor and energized in circuit with a second portion of said voltage divider circuit means; and said second transistor circuit means changing an input voltage to said first transistor switching means in the event that said negative coefficient thermistor opens circuits or becomes a low value indicative of an over-temperature condition to thereby switch and de-energize said relay means to open said pair of power switching terminals to de-energize said electrical apparatus.

References Cited

UNITED STATES PATENTS

| 3,032,690 | 5/1962 | Elliot | 317—13 X |
| 3,225,280 | 12/1965 | Happe et al. | 317—13 |
| 3,257,607 | 6/1966 | Pintell | 317—13 |
| 3,262,014 | 7/1966 | Conner | 317—13 |
| 3,305,698 | 2/1967 | Bargen et al. | 317—13 |

MILTON O. HIRSHFIELD, *Primary Examiner.*

R. V. LUPO, *Assistant Examiner.*